(12) United States Patent
Huber

(10) Patent No.: US 6,890,375 B2
(45) Date of Patent: May 10, 2005

(54) CYCLONIC AIR FILTER WITH EXIT BAFFLE

(76) Inventor: Keith L. Huber, One Povenir Pl., Gulfport, MS (US) 39507

( * ) Notice: Subject to any disclaimer, the term of this patent is extended or adjusted under 35 U.S.C. 154(b) by 48 days.

(21) Appl. No.: 10/369,835

(22) Filed: Feb. 20, 2003

(65) Prior Publication Data

US 2004/0163538 A1 Aug. 26, 2004

(51) Int. Cl.$^7$ .............................................. B01D 45/16
(52) U.S. Cl. ............................ 95/271; 55/345; 55/447; 55/459.1; 210/512.2; 210/788
(58) Field of Search ...................... 55/345, 447, 459.1, 55/460, 482, DIG. 3; 95/271; 210/787, 788, 512.1, 512.2; 209/725

(56) References Cited

U.S. PATENT DOCUMENTS

| | | | |
|---|---|---|---|
| 1,344,585 A | | 6/1920 | Hewitt et al. ................ 209/723 |
| 1,380,698 A | | 6/1921 | Anspach et al. .............. 55/345 |
| 1,897,195 A | * | 2/1933 | Howden .................... 55/345 X |
| 2,432,757 A | * | 12/1947 | Weniger ................. 55/459.1 X |
| 2,569,710 A | | 10/1951 | Fitzpatrick ................... 55/396 |
| 2,941,621 A | | 6/1960 | Dygert et al. ................. 55/321 |
| 3,400,784 A | * | 9/1968 | Thrasher ................ 55/459.1 X |
| 3,960,734 A | | 6/1976 | Zagorski .................. 210/512.2 |
| 4,108,778 A | | 8/1978 | Lambert et al. ............ 210/297 |
| 5,190,650 A | | 3/1993 | Tammera et al. ........... 210/256 |
| 5,254,147 A | | 10/1993 | Finke ........................... 55/337 |
| 5,496,394 A | * | 3/1996 | Nied ............................. 95/271 |
| 5,643,470 A | * | 7/1997 | Amini ....................... 210/787 |
| 5,788,728 A | | 8/1998 | Solis et al. .................... 55/422 |
| 6,010,550 A | * | 1/2000 | Song ............................ 55/482 |
| 6,119,870 A | * | 9/2000 | Maciejewski et al. ...... 209/725 |
| 6,129,775 A | | 10/2000 | Conrad et al. ................ 55/337 |
| 6,168,716 B1 | | 1/2001 | Conrad et al. ........... 210/512.2 |
| 6,238,451 B1 | | 5/2001 | Conrad et al. ................ 55/323 |
| 6,277,278 B1 | | 8/2001 | Conrad et al. ........... 210/512.1 |
| 6,312,594 B1 | | 11/2001 | Conrad et al. ........... 210/512.2 |
| 6,475,255 B1 | | 11/2002 | Walker, Jr. ................... 55/315 |
| 6,475,267 B1 | * | 11/2002 | Lehn ............................ 95/271 |
| 6,692,552 B2 | * | 2/2004 | Benham ................ 55/459.1 X |
| 6,743,359 B1 | * | 6/2004 | Smyth et al. ............ 210/512.1 |
| 2002/0011053 A1 | | 1/2002 | Oh ............................... 55/426 |
| 2002/0069757 A1 | * | 6/2002 | Lehn ............................ 95/271 |
| 2002/0189452 A1 | * | 12/2002 | Benham .................. 55/345 X |

FOREIGN PATENT DOCUMENTS

GB 2146922 * 5/1985 .............. 210/512.1

* cited by examiner

Primary Examiner—Richard L. Chiesa
(74) Attorney, Agent, or Firm—Sidley Austin Brown & Wood LLP

(57) ABSTRACT

The described embodiments of the present invention include a cyclonic filter having an inlet and outlet. The cyclonic filter includes a chamber in communication with the inlet, flow from the inlet being directed in a rotational flow about an axis within the chamber. The cyclonic filter also includes a first baffle element positioned in the chamber, the first baffle element having at least one inlet. The cyclonic filter further includes a second baffle element positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the outlet.

36 Claims, 4 Drawing Sheets

CYCLONIC AIR FILTER WITH EXIT BAFFLE

FIELD OF THE INVENTION

The present invention relates to the field of air filtration. More specifically, the present invention relates to the field of cyclonic air filtration.

BACKGROUND OF THE INVENTION

One of many techniques for filtering air is the cyclonic filter. In this technique, air is caused to swirl in a cylindrical enclosure.

An example of a cyclonic filter may be found in Conrad et al., U.S. Pat. No. 6,312,594. Cyclone separators are devices that utilize centrifugal forces and low pressure caused by spinning motion to separate materials of differing density, size and shape. Particles in the air are forced to the outside of the cylinder by inertia (centrifugal force). Due to surface effects, the air flow at the wall is slower. The slow air layer is incapable of suspending many of the particles, so these particles drop to the bottom of the device. The following is a description of the operating principles of a cyclone separator in terms of its application to removing entrained particles from a gas stream, such as may be used in a vacuum cleaner.

The example cyclone separator has an inlet pipe and a main body comprising a cylinder. The particle laden gas stream is injected through inlet pipe, which is positioned tangentially to the interior wall of the cylinder. The shape of the cylinder induces the gas stream to spin creating a vortex. Larger or more dense particles are forced outwards to the walls of the cyclone separator, where the drag of the spinning air as well as the force of gravity causes them to fall down the walls into an outlet or collector. The lighter or less dense particles, as well as the gas medium itself, reverses course near the bottom center of the cylinder and pass upwardly through the low pressure center of the vortex and exit the separator via an outlet that is positioned in the upper portion of the cylinder.

The separation process in cyclones generally requires a steady flow free of fluctuations or short term variations in the flow rate. The inlet and outlets of cyclone separators are typically operated open to the atmosphere so that there is minimal pressure difference between the two. If one of the outlets must be operated at a back pressure, both outlets would typically be kept at approximately the same pressure.

However, as noted above, many of the smaller and/or lighter particles are not precipitated out and additional filters must be used at the outlet of the cyclonic device. These filters require repeated cleaning and may clog permanently, requiring replacement. This invention is directed to a device for minimizing those filters.

SUMMARY

The described embodiments of the present invention include a cyclonic filter having an inlet and outlet. The cyclonic filter includes a chamber in communication with the inlet, flow from the inlet being directed in a rotational flow about an axis within the chamber. The cyclonic filter also includes a first baffle element positioned in the chamber, the first baffle element having at least one inlet. The cyclonic filter further includes a second baffle element positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the outlet. The inlet of the first baffle element may include a flare for increased effectiveness in removing particles from a medium.

Another embodiment of the present invention includes a cyclonic filter with a chamber having an inlet positioned eccentrically to a center axis of the chamber, flow from the inlet being directed in a rotational flow about the center axis within the chamber, the center axis being positioned vertically. A first baffle element is positioned in the chamber, the first baffle element having at least one inlet, the first baffle element having a base substantally positioned at the top of the chamber and having an apex extending into the chamber. A second baffle element is positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the outlet. The inlet of the first baffle element may include a flare for increased effectiveness in removing particles from a medium.

DETAILED DESCRIPTION

Figure 1:
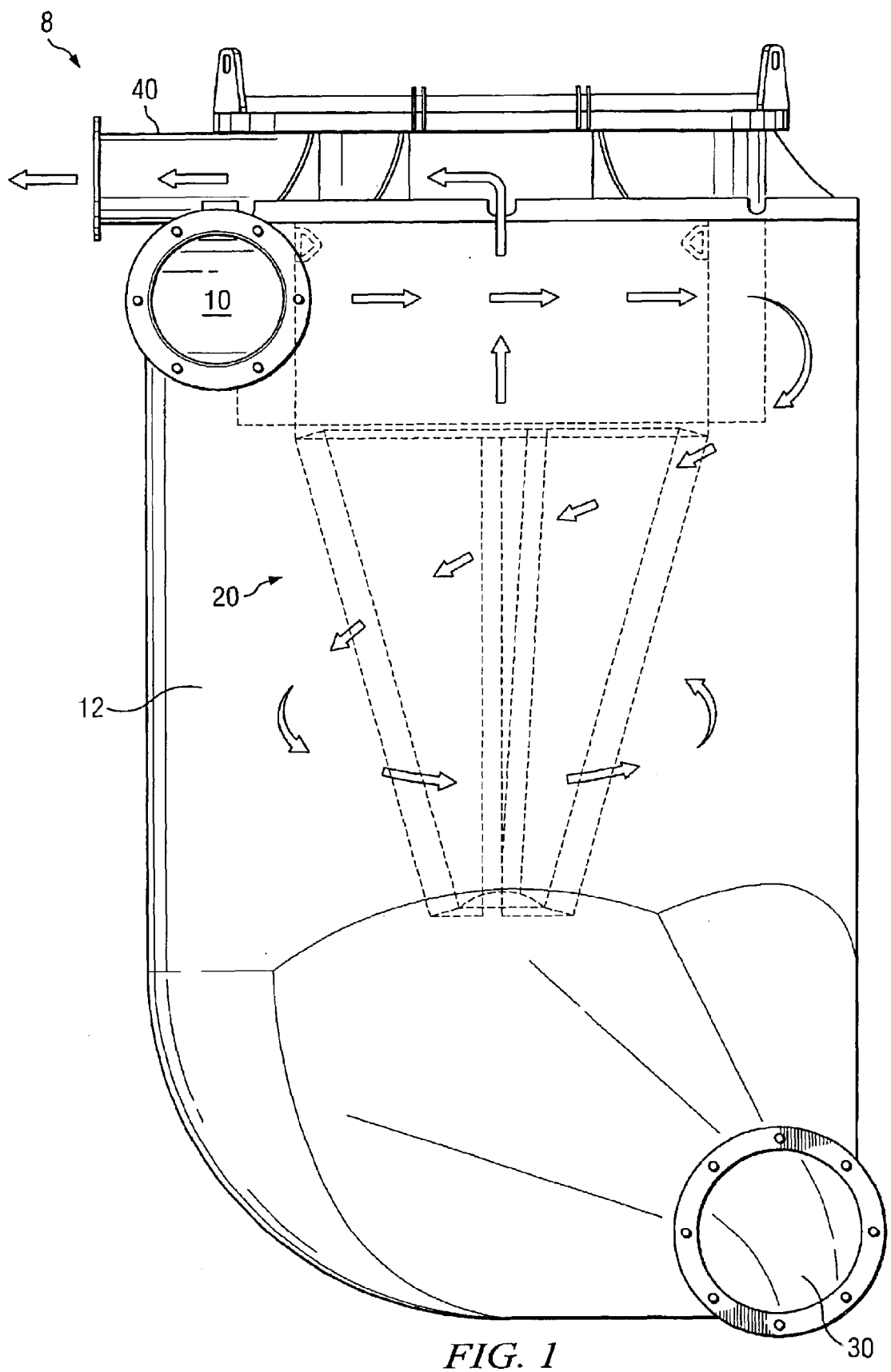
FIG. 1 is a side view of one embodiment of the present invention.
Figure 2:
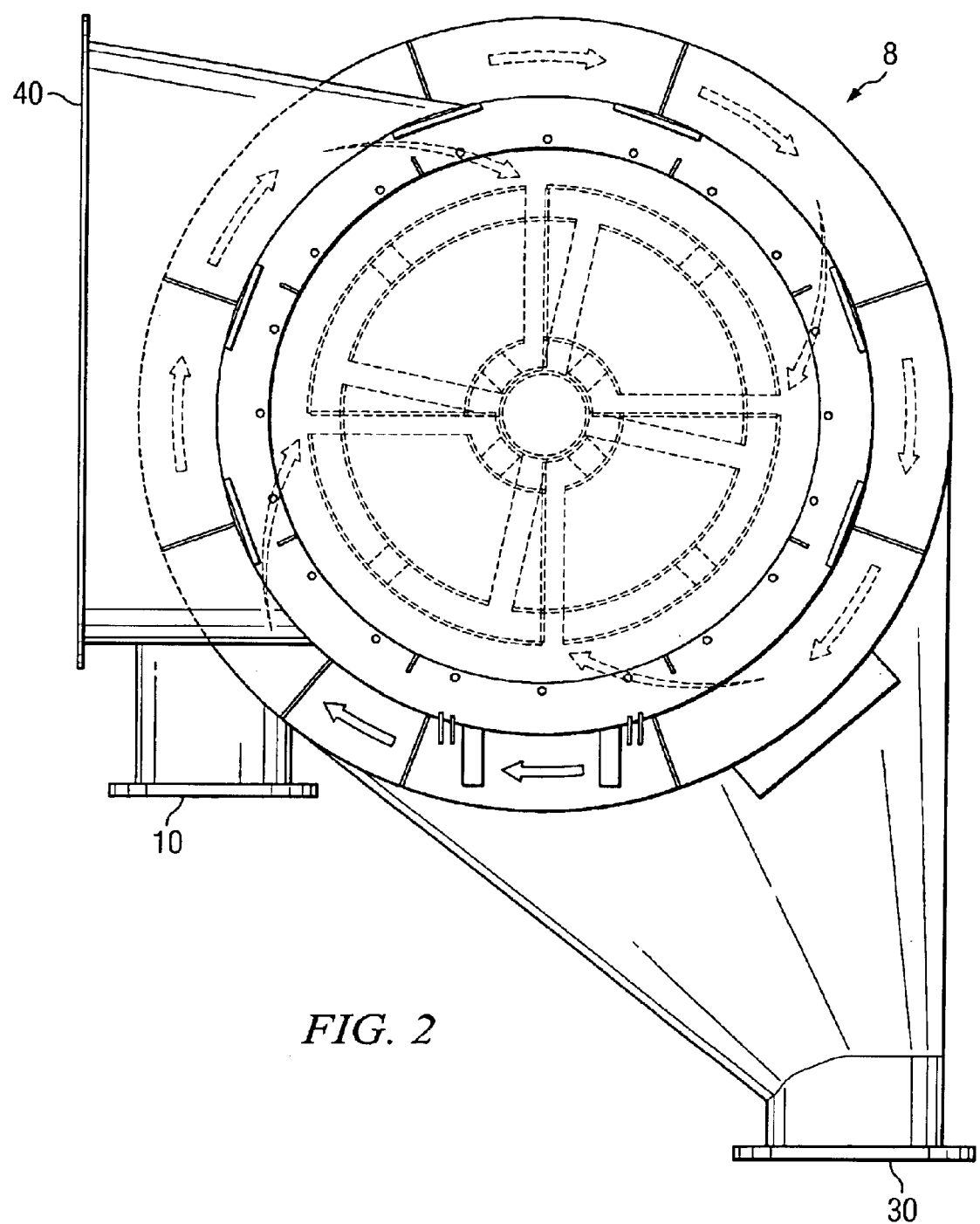
FIG. 2 is a top view of the embodiment of FIG. 1.

FIG. 1 is a side view of cyclonic seperator 8 that comprises a preferred embodiment of the present invention. A medium to be filtered, such as air, enters the cyclonic chamber 12 at inlet 10. The tangential position of the inlet 10 induces a vortex within cyclonic chamber 12. The movement of air may be caused by a source of pressure at inlet 10, but more likely is provided by a source of vacuum connected to outlet 40. The vortex action causes particles entrained in the medium to precipitate out of the medium due to centrifugal force and due to the slowing of the medium at the surface of the cyclonic chamber due to frictional forces. Particles that are precipitated out are removed through the dust and particle removal opening 30. The particles may be removed manually by removing a cover (not shown) of opening 30 or a pumping mechanism may be connected to opening 30. However, any pumping mechanism must be designed not to disrupt the primary flow of the cyclonic separator 8 or the vortex established within cyclonic chamber 12. Therefore, the action of the pumping mechanism would normally be limited to periods of time when cyclonic seperator 8 is not in use. The medium then passes through baffle filter 20 and exits at outlet 40. FIG. 2 is a top view of cyclonic separator 8.

Cyclonic chamber 12 may be fabricated using any known material having sufficient strength. Examples of such materials are cast iron, cast aluminum, steel and high strength plastics. In additon, the interior of cyclonic chamber 12 may be coated or anodized to provide corrosion resistance and/or to optimize the frictional properties vis-à-vis the medium. The preferred materials are stainless steel, mild steel for non-corrosive applications or high strength low alloy steel with appropriate heat treament.

Figure 3A:
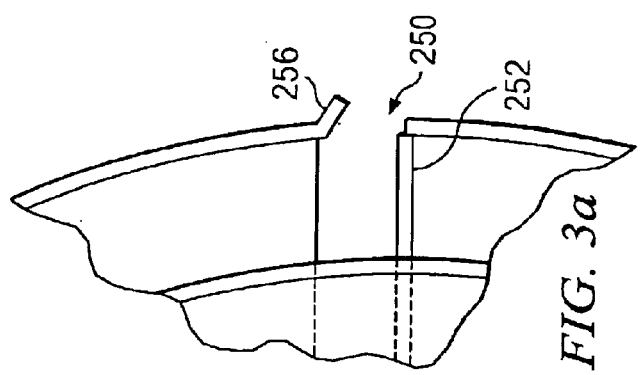
FIG. 3a is a top view of an alternate embodiment of the baffles.
Figure 3:
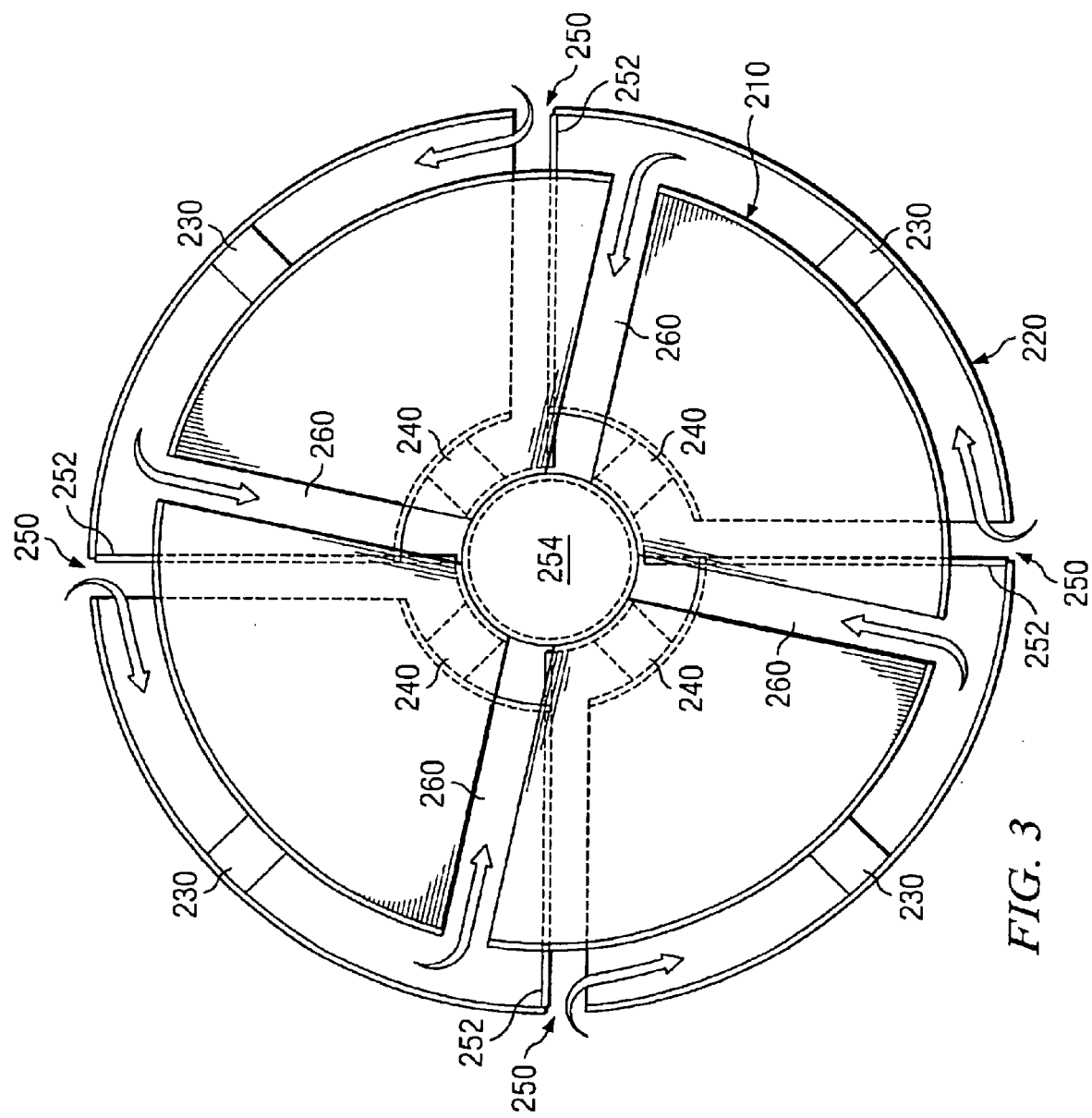
FIG. 3 is a top view of the baffles of the embodiment of FIG. 1.

FIG. 3 is a top view of baffle filter 20. In the preferred embodiment, baffle filter 20 is conical, although the use of many other configurations will become apparent to those skilled in the art in light of this specification. Inside baffle 210 fits inside outside baffle 220. The baffles are held in relative position to each other at the top by braces 230 and at the bottom by braces 240. Seal 254 seals the bottom of baffle 210. Inlets 250 in outside baffle 220 allow the medium to enter the gap between the two baffles. The positioning of inlets 250 relative to outlets 260 (explained below) along with barriers 252 insure that the medium will make a 180° turn. That is, the cyclone action of the filter causes the medium to circulate clockwise relative to FIG. 3. Barriers 252 are positioned clockwise relative to inlets 250, which prevents continued clockwise flow of the medium so that the medium will be turned to a counter-clockwise flow between baffles 210 and 220. This 180° turn causes the flow to essentially stop and reverse course, which causes a large amount of fine particles to precipitate out of the medium. These particles fall out of the apex of baffle 220 into a relatively low turbulence area of the cyclonic chamber 20 and ultimately end up at the dust and particle removal outlet 30.

The turned air then continues to outlets 260 in inside baffle 210. At outlets 260, the medium makes a 90° turn, which causes further particle precipitation. After passing through outlets 260, the filtered medium exits through outlet 40 (FIG. 1). Inside and outside baffles may be fabricated using any material having sufficient strength. The preferred material is steel, which allows for welded joints to braces 230 and 240, seal 254 and barriers 250. Stainless steel may be preferred in high durability uses, but is more costly and difficult to fabricate. For corrosion resistance, galvanized steel may be used. Other suitable materials include aluminum and high strength plastics. In addition to welding the components of conical filter 20 may be assembled using known fasteners, such as screws and rivets. The prefered method of assembly is welding.

Figure 4:
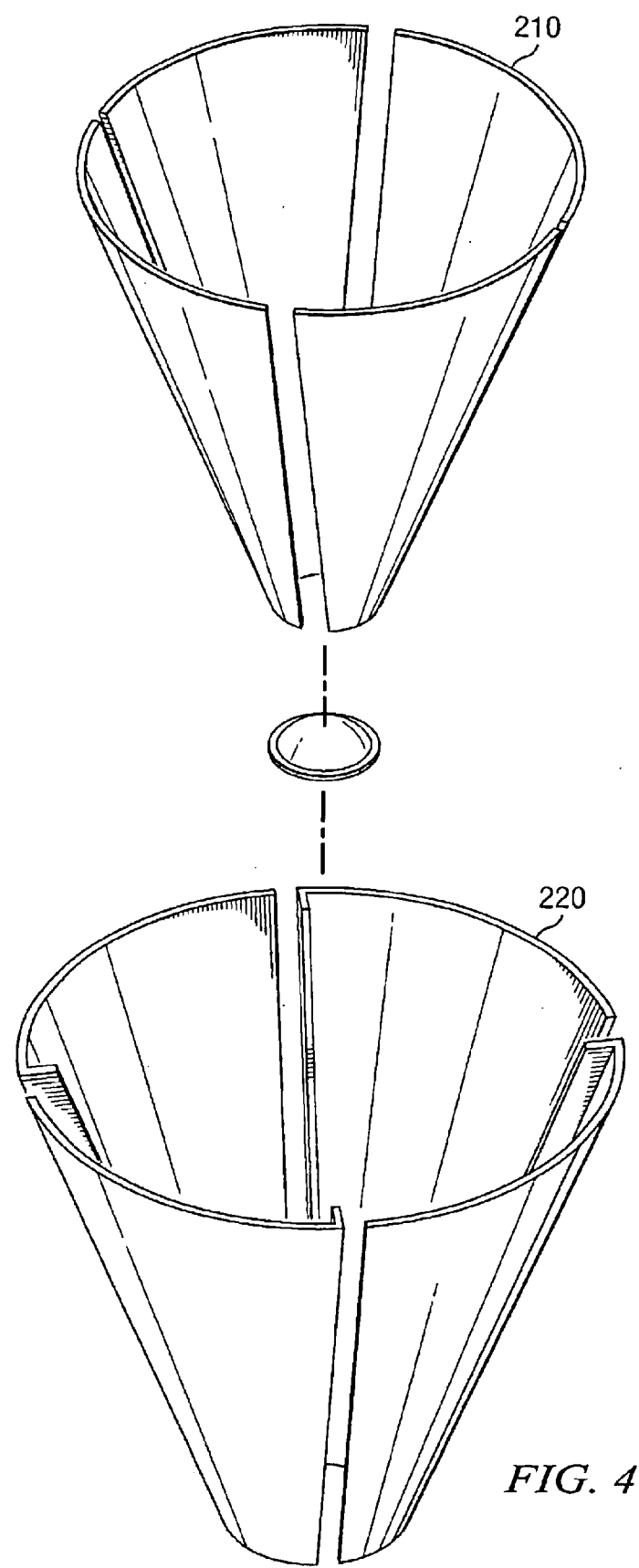
FIG. 4 is an exploded view of the baffles of the embodiment of FIG. 1.

An additional embodiment of the present invention is illustrated in FIG. 3a. This FIGURE illustrates the use of a flared opening to inlet 250. Flare 256 is positioned at the opening of inlets 250 on the up-stream portion of inlets 250 relative to the flow within cyclonic chamber 12. Flares 256 accentuate the change in direction of the flow at inlets 250, accelerate the speed of flow around flares 256 and cause an additional pressure drop. All of these factors enhance the precipitation of particles from the medium. FIG. 4 is an exploded view of conical filter 20 showing the relationship of baffles 210 and 220.

Although the present invention has been described with regard to several embodiments, those embodiments are not to be construed as limiting the scope of the invention. Many embodiments of the invention will become apparent to those skilled in the art in light of the teachings of this specification. For example, the present invention is described where the filtered medium is air. However, the scope of the invention is not limited to filtration of air, but may be used for a number of fluids, such as gases and liquids, such as water. In addition, although the described embodiment uses two baffles, the invention may be advantageously used with three or more baffles. The only limitation of the scope of the invention are the claims appended hereto and equivalents thereof.

What is claimed is:

1. A cyclonic filter having an inlet and outlet comprising:
   a chamber in communication with the inlet, flow from the inlet being directed in a rotational flow about an axis within the chamber;
   a first baffle element positioned in the chamber, the first baffle element having at least one inlet; and
   a second baffle element positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the filter outlet.

2. A cyclonic filter as in claim 1 wherein the first baffle element is conical.

3. A cyclonic filter as in claim 1 wherein the second baffle element is conical.

4. A cyclonic filter as in claim 1 wherein the first and second baffle elements are conical.

5. A cyclonic filter as in claim 2 wherein the at least one inlet of the first baffle element extends from the apex to the base of the first baffle element.

6. A cyclonic filter as in claim 3 wherein the at least one outlet of the second baffle element extends from the apex to the base of the second baffle element.

7. A cyclonic filter as in claim 1 further comprising a barrier positioned between the first and second baffle elements, the barrier substantially preventing flow between the first and second baffle elements in the direction of the rotational flow.

8. A cyclonic filter as in claim 4 wherein the apexes of the first and second baffle elements are directed downward.

9. A cyclonic filter as in claim 4 wherein the apex of the second baffle element is closed and the apex of the first baffle element is open.

10. A cyclonic filter as in claim 1 wherein the first baffle element has four inlets.

11. A cyclonic filter as in claim 1 wherein the second baffle element has four outlets.

12. A cyclonic filter as in claim 1 further comprising a flare at the at least one inlet of the first baffle element.

13. A cyclonic filter comprising:
   a chamber having an inlet and an outlet, the inlet positioned eccentrically to a center axis of the chamber, flow from the inlet being directed in a rotational flow about the center axis within the chamber, the center axis being positioned vertically;
   a first baffle element positioned in the chamber, the first baffle element having at least one inlet, the first baffle element having a base substantially positioned at the top of the chamber and having an apex extending into the chamber; and
   a second baffle element positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the outlet of the chamber.

14. A cyclonic filter as in claim 13 wherein the first baffle element is conical.

15. A cyclonic filter as in claim 13 wherein the second baffle element is conical.

16. A cyclonic filter as in claim 13 wherein the first and second baffle elements are conical.

17. A cyclonic filter as in claim 14 wherein the at least one inlet of the first baffle element extends from the apex to the base of the first baffle element.

18. A cyclonic filter as in claim 15 wherein the at least one outlet of the second baffle element extends from the apex to the base of the second baffle element.

19. A cyclonic filter as in claim 13 further comprising a barrier positioned between the first and second baffle elements, the barrier substantially preventing flow between the first and second baffle elements in the direction of the rotational flow.

20. A cyclonic filter as in claim 16 wherein the apexes of the first and second baffle elements are directed downward.

21. A cyclonic filter as in claim 16 wherein the apex of the second baffle element is closed and the apex of the first baffle element is open.

22. A cyclonic filter as in claim 13 wherein the first baffle element has four inlets.

23. A cyclonic filter as in claim 13 wherein the second baffle element has four inlets.

24. A cyclonic filter as in claim 13 further comprising a flare at the at least one inlet of the first baffle element.

25. A method for providing cyclonic filtration comprising:

providing a chamber in communication with an inlet and an outlet, flow from the inlet being directed in a rotational flow about an axis within the chamber;

redirecting the rotational flow by providing a first baffle element positioned in the chamber, the first baffle element having at least one inlet; and further redirecting the rotational flow by providing a second baffle element positioned within the first baffle element, the second baffle element having at least one outlet, the at least one outlet of the second baffle element being positioned relative to the at least one inlet of the first baffle element in a direction opposite to the rotational flow, the interior of the second baffle element being in communication with the outlet of the chamber.

26. A method as in claim 25 wherein the first baffle element is conical.

27. A method as in claim 25 wherein the second baffle element is conical.

28. A method as in claim 25 wherein the first and second baffle elements are conical.

29. A method as in claim 26 wherein the at least one inlet of the first baffle element extends from the apex to the base of the first baffle element.

30. A method as in claim 27 wherein the at least one outlet of the second baffle element extends from the apex to the base of the second baffle element.

31. A method as in claim 25 further comprising a barrier positioned between the first and second baffle elements, the barrier substantially preventing flow between the first and second baffle elements in the direction of the rotational flow.

32. A method as in claim 28 wherein the apexes of the first and second baffle elements are directed downward.

33. A method as in claim 28 wherein the apex of the second baffle element is closed and the apex of the first baffle element is open.

34. A method as in claim 25 wherein the first baffle element has four inlets.

35. A method as in claim 25 wherein the second baffle element has four outlets.

36. A method as in claim 25 further comprising a flare at the at least one inlet of the first baffle element.

* * * * *